US009301262B2

(12) United States Patent
Ljung

(10) Patent No.: US 9,301,262 B2
(45) Date of Patent: Mar. 29, 2016

(54) POWER CONTROL METHOD AND MOBILE COMMUNICATION TERMINAL

(71) Applicant: Rickard Ljung, Helsingborg (SE)

(72) Inventor: Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/360,110

(22) PCT Filed: Jun. 18, 2013

(86) PCT No.: PCT/IB2013/001269
§ 371 (c)(1),
(2) Date: May 22, 2014

(87) PCT Pub. No.: WO2014/203016
PCT Pub. Date: Dec. 24, 2014

(65) Prior Publication Data
US 2015/0223175 A1  Aug. 6, 2015

(51) Int. Cl.
*H04W 52/20* (2009.01)
*H04W 52/14* (2009.01)
*H04L 5/00* (2006.01)
*H04W 52/12* (2009.01)

(52) U.S. Cl.
CPC ............. *H04W 52/20* (2013.01); *H04L 5/0048* (2013.01); *H04W 52/12* (2013.01); *H04W 52/143* (2013.01)

(58) Field of Classification Search
CPC ...... H04W 52/12; H04W 52/20; H04W 52/34
See application file for complete search history.

(56) References Cited

U.S. PATENT DOCUMENTS

| 7,620,415 | B2 * | 11/2009 | Ashkenazi | H04W 52/143 455/522 |
| 8,265,681 | B2 * | 9/2012 | Wang | H04W 52/12 370/318 |
| 2005/0047354 | A1 * | 3/2005 | Zeira | H04W 36/30 370/280 |
| 2005/0143116 | A1 * | 6/2005 | Hsu | H04W 52/12 455/522 |
| 2007/0248190 | A1 | 10/2007 | Nilsson | |
| 2008/0148133 | A1 * | 6/2008 | Duggan | H03M 13/3753 714/796 |
| 2010/0275107 | A1 * | 10/2010 | Peters | H03M 13/2975 714/799 |

FOREIGN PATENT DOCUMENTS

WO    2008/076050 A2    6/2008

OTHER PUBLICATIONS

International Search Report and Written Opinion dated Sep. 2, 2013 issued in corresponding PCT application No. PCT/IB2013/001269, 11 pages.

(Continued)

*Primary Examiner* — Bobbak Safaipour
(74) *Attorney, Agent, or Firm* — Tucker Ellis LLP

(57) ABSTRACT

A power control method performed by a mobile communication terminal comprises determining a received signal code power of common pilot channel signals received from a base station on a common pilot channel in at least one time interval. A block error rate determination is performed to determine a block error rate for transmissions received from the base station. A downlink outer loop power control is performed in dependence on the determined received signal code power of the common pilot channel signals until the block error rate determination fulfills a convergence criterion.

11 Claims, 4 Drawing Sheets

(56) References Cited

OTHER PUBLICATIONS

Top Optimized Technologies: "Study or Work Item proposal for Outer Loop Power Control (OLPC) convergence speed (Downlink System Level simulations)", 3GPP Draft; R4-051038, 3rd Generation Partnership Project (3GPP), Mobile Competence Centre ; 650, Route Des Lucioles ; F-06921 Sophia Antipolis Cedex, France, vol. RAN WG4, no. London, UK; 20050903, Sep. 3, 2005, XP050174606, [retrieved on Sep. 3, 2005] paragraph [0006]—paragraph [0007].

* cited by examiner

POWER CONTROL METHOD AND MOBILE COMMUNICATION TERMINAL

FIELD OF THE INVENTION

Embodiments of the invention relate to power control techniques for mobile communication. Embodiments of the invention relate in particular to power control techniques for downlink transmissions in a cellular network.

BACKGROUND OF THE INVENTION

Power control is an important functionality in a mobile communication system. Power control may be used for saving terminal or base station power consumption and/or to ensure coverage by the mobile communication system and sufficient capacity. With increasing popularity of mobile voice and data communication, there is an ever increasing demand for efficient power control to increase system capacity.

Techniques for downlink power control are generally resident in a mobile communication terminal. The downlink power control techniques may also include components in the mobile communication network, e.g. in the radio access network. For illustration, an open loop power control may be used in a base station to estimate an initial output power for downlink transmissions when a new connection is established.

One or several power control algorithms may be used in the mobile communication terminal. For illustration, in Wideband Code Division Multiple Access (WCDMA) networks, an outer loop power control and an inner loop power control may be implemented in the mobile communication terminal for downlink power control.

The outer loop power control for the downlink, which is also referred to as downlink outer loop power control herein, is an algorithm for maintaining an acceptable target signal-to-interference ratio (SIR). In order to define a certain target SIR target, the downlink outer loop power control algorithm conventionally estimates a packet block error rate (BLER) from base station transmissions.

The downlink inner loop power control, which is also referred to as closed loop power control or as fast inner or closed loop power control, is responsible for following the specific target SIR defined by the downlink outer loop power control. The downlink inner loop power control for downlink transmissions resides in the mobile communication terminal and sends explicit power up or power down commands to the base station.

The determination of the BLER required for the downlink outer loop power control may be a comparatively slow process, in particular when the BLER is low. The determination of the BLER then requires incoming packets to be monitored for a BLER for an extended time to obtain a reliable estimate for the BLER. This process, also called convergence of the BLER determination or convergence of the downlink outer loop power control, may have the effect that the base station continues to transmit signals with powers that are greater than would actually be required, because the downlink outer loop power control resident in the mobile communication terminal is still in the convergence phase. This may increase interference also for other mobile communication terminals. Increased power consumption and/or lower system capacity may result.

SUMMARY OF THE INVENTION

There is a continued need in the art for methods and devices which address at least some of the shortcomings of conventional techniques described above. There is a continued need in the art for methods and devices which provide improved power control for the downlink even when a block error rate determination performed by a mobile communication terminal for downlink outer loop power control is still in a convergence phase. There is a continued need in the art for methods and devices which allow interference and/or system capacity to be improved compared to conventional techniques.

According to embodiments of the invention, a method and a mobile communication terminal as defined in the claims are provided.

According to an embodiment, a power control method is provided. The power control method is performed by a mobile communication terminal. The power control method is a method of performing downlink power control using an improved outer loop power control. In the method, a received signal code power (RSCP) of common pilot channel (CPICH) signals received from a base station on a CPICH in at least one time interval is determined. A block error rate (BLER) determination is performed to determine a block error rate for transmissions received from the base station. A downlink outer loop power control is performed in dependence on the determined RSCP of the CPICH signals after a connection setup and until the BLER determination fulfills a convergence criterion.

The downlink outer loop power control may be performed independently of the determined RSCP of the CPICH signals after the BLER determination fulfills the convergence criterion.

The downlink outer loop power control may be performed in dependence on the determined RSCP in a convergence time period which is triggered by the connection setup and which terminates when the BLER determination fulfills the convergence criterion.

Determining the RSCP may comprise determining a first RSCP of the CPICH signals in a first time interval after connection setup. Determining the RSCP may comprise determining a second RSCP of the CPICH signals in a second time interval which starts later than the first time interval. The second time interval may start after the first time interval expired.

The downlink outer loop power control may be performed in dependence on a comparison of the second RSCP and a signal code power threshold which is determined in dependence on the first RSCP. A target signal-to-interference ratio (SIR) may be adjusted in dependence on the comparison of the second RSCP and the signal code power threshold.

The target SIR may be decreased if the second RSCP exceeds a first threshold. The first threshold may be determined in dependence on the first RSCP.

The target SIR may be increased if the second RSCP is lower than a second threshold which is less than the first threshold. The second threshold may be determined in dependence on the RSCP.

The downlink outer loop power control may be performed in dependence on a ratio between the second RSCP and the first RSCP until the BLER determination fulfills the convergence criterion.

Determining the second RSCP and adjusting the target SIR may be repeated several times, until the BLER determination fulfills the convergence criterion.

An inner loop power control may be performed in dependence on the target SIR. The target SIR may be set in dependence on the second RSCP and the first RSCP. The target SIR may be set in dependence on the threshold comparison of a ratio between the second RSCP and the first RSCP.

The first RSCP may be a time-average of the RSCP of the CPICH signals in the first time interval. The second RSCP may be a time-average a time-average of the RSCP of the CPICH signals in the second time interval. A sliding observation window may be used in which averaging is respectively performed to identify slow-phase variations of the RSCP of the CPICH signals.

A transmit power of the communication terminal may be controlled in dependence on the determined RSCP of the CPICH signals until the BLER determination fulfills the convergence criterion. An uplink power control may be performed in dependence on the determined RSCP of the CPICH signals until the BLER determination fulfills the convergence criterion.

The power control method may comprise monitoring whether the BLER determination fulfills the convergence criterion.

The BLER determination may fulfill the convergence criterion if a variance of the determined BLER is less than a variance threshold.

The BLER determination may fulfill the convergence criterion if a convergence time period has lapsed since connection setup, with a duration of the convergence time period being determined based on a mean value of the determined BLER.

The BLER determination may fulfill the convergence criterion if a variance of a target SIR determined based on the BLER is less than a SIR variance threshold.

The BLER determination may fulfill the convergence criterion if a variance of the target SIR determined based on the BLER is less than a SIR variance threshold.

Performing the downlink outer loop power control based on the RSCP of the CPICH signals may comprise determining whether radio channel properties have become better or worse based on the RSCP of the CPICH, and adjusting a target SIR based on whether the radio channel properties have become better or worse.

The RSCP of the CPICH signals may be the received power on one code measured on the Primary CPICH. The reference point for the RSCP may be an antenna connector of the mobile communication terminal.

If transmission (Tx) diversity in the downlink is applied on the Primary CPICH, determining the RSCP of the CPICH signals may comprise measuring the RSCP from each antenna separately and summing the measured RSCPs to a total RSCP on the Primary CPICH.

The BLER determination may be performed for transmissions from the base station over a transport channel. The BLER determination may be performed for transmissions from the base station which include data for data or voice communication.

A mobile communication terminal according to an embodiment comprises a receiver configured to receive signals from a base station. The mobile communication terminal comprises a processing device coupled to the receiver. The processing device is configured to determine a RSCP of CPICH signals received from a base station on a CPICH in at least one time interval. The processing device is configured to perform a BLER determination to determine a BLER for transmissions received from the base station. The processing device is configured to perform a downlink outer loop power control, wherein, in response to a connection setup, the downlink outer loop power control is performed in dependence on the determined RSCP of the CPICH signals until the BLER determination fulfills a convergence criterion.

The processing device may be configured to perform the downlink outer loop power control independently of the determined RSCP of the CPICH signals after the BLER determination fulfills the convergence criterion.

The processing device may be configured to perform the downlink outer loop power control in dependence on the determined RSCP in a convergence time period which is triggered by the connection setup and which terminates when the BLER determination fulfills the convergence criterion.

The processing device may be configured to determine a first RSCP of the CPICH signals in a first time interval after connection setup. The processing device may be configured to determine a second RSCP of the CPICH signals in a second time interval which starts later than the first time interval.

The processing device may be configured to perform the downlink outer loop power control in dependence on a comparison of the second RSCP and a signal code power threshold which is determined in dependence on the first RSCP. A target SIR may be adjusted in dependence on the comparison of the second RSCP and the signal code power threshold.

The processing device may be configured to decrease the target SIR if the second RSCP exceeds a first threshold. The processing device may be configured to determine the first threshold in dependence on the first RSCP.

The processing device may be configured to increase the target SIR if the second RSCP is lower than a second threshold which is less than the first threshold. The processing device may be configured to determine the second threshold in dependence on the first RSCP.

The processing device may be configured to repeatedly determine the second RSCP and adjust the target SIR, until the BLER determination fulfills the convergence criterion.

The processing device may be configured to perform an inner loop power control in dependence on the target SIR, with the target SIR being set in dependence on the second RSCP and the first RSCP. The processing device may be configured to perform an inner loop power control in dependence on the target SIR, with the target SIR being set in dependence on the threshold comparison of a ratio between the second RSCP and the first RSCP.

The processing device may be configured to determine the first RSCP as a time-average of the RSCP of the CPICH signals in the first time interval. The processing device may be configured to determine the second RSCP as a time-average of the RSCP of the CPICH signals in the second time interval. The processing device may be configured to use a sliding observation window in which averaging is respectively performed to identify slow-phase variations of the RSCP of the CPICH signals.

The processing device may be configured to control a transmit power of the mobile communication terminal for uplink transmissions in dependence on the determined RSCP of the CPICH signals until the BLER determination fulfills the convergence criterion. The processing device may be configured to perform an uplink power control in dependence on the determined RSCP of the CPICH signals until the BLER determination fulfills the convergence criterion.

The processing device may be configured to monitor whether the BLER determination fulfills the convergence criterion.

The processing device may be configured to establish that the BLER determination fulfills the convergence criterion if a variance of the determined BLER is less than a variance threshold.

The processing device may be configured to establish that the BLER determination fulfills the convergence criterion if a convergence time period has lapsed since connection setup, with a duration of the convergence time period being determined based on a mean of the BLER.

The processing device may be configured to establish that the BLER determination fulfills the convergence criterion if a variance of a target SIR determined based on the BLER is less than a SIR variance threshold.

The processing device may be configured to establish that the BLER determination fulfills the convergence criterion if a variance of a target SIR determined based on the BLER is less than a SIR variance threshold.

The processing device may be configured to determine whether radio channel properties have become better or worse based on the RSCP of the CPICH, and to adjust a target SIR based on whether the radio channel properties have become better or worse to perform the downlink outer loop power control based on the RSCP of the CPICH signals.

The processing device may be configured to determine the RSCP of the CPICH signals as the received power on one code measured on the Primary CPICH. The processing device may be configured to determine the RSCP of the CPICH signals at an antenna connector of the mobile communication terminal as reference point.

The mobile communication terminal may have a plurality of antennas for transmission (Tx) diversity in the downlink. The processing device may be configured to measure the RSCP from each antenna separately and may sum the measured RSCPs to a total RSCP on the Primary CPICH.

The processing device may be configured to perform the BLER determination for transmissions received from the base station over a transport channel. The processing device may be configured to perform the BLER determination for transmissions from the base station which include data for data or voice communication.

The mobile communication terminal may comprise a transmitter. The processing device may be coupled to the transmitter and may be configured to control a transmit power of the communication terminal in dependence on the determined RSCP of the CPICH signals until the BLER determination fulfills the convergence criterion.

The mobile communication terminal may be configured to perform the method according to any aspect or embodiment.

According to another embodiment, a communication system is provided. The communication system comprises a base station and the mobile communication terminal according to an aspect or embodiment.

The base station may be configured to perform an open loop control power control for the downlink upon connection setup. The base station may be configured to estimate what initial output power it shall utilize when starting up a new connection with the mobile communication terminal.

The method, devices and systems according to embodiments take downlink CPICH received power statistics into account for the downlink outer loop power control while the BLER determination is still converging after connection setup. The downlink outer loop power control may be improved by taking into account the RSCP statistics from non-power controlled signals such as the CPICH signals. The downlink outer loop power control may respond to changes in the RSCP of the CPICH signals even when the BLER is still not known with a high accuracy.

Although specific features described in the above summary and the following detailed description are described in connection with specific embodiments and aspects of the present invention, it should be understood that the features of the embodiments and aspects may be combined with each other unless specifically noted otherwise.

BRIEF DESCRIPTION OF THE DRAWINGS

Embodiments of the invention will now be described in more detail with reference to the accompanying drawings in which like reference numerals designate like elements.

DETAILED DESCRIPTION OF PREFERRED EMBODIMENTS

In the following, exemplary embodiments of the invention will be described in more detail. It is to be understood that the features of the various exemplary embodiments described herein may be combined with each other unless specifically noted otherwise.

Figure 1:
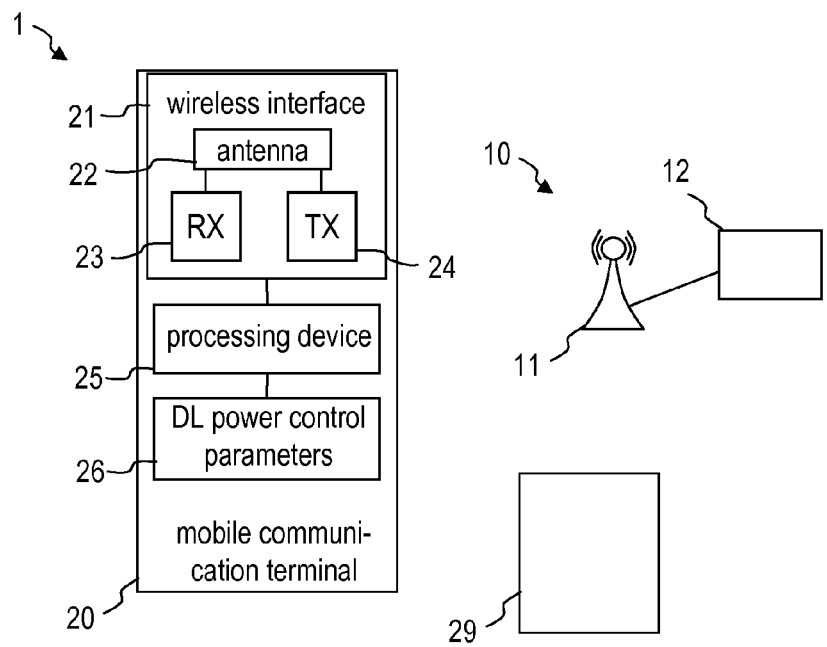
FIG. 1 shows a wireless communication system which includes a mobile communication terminal according to an embodiment.

FIG. 1 is a schematic view of a communication system 1 according to an embodiment. The communication system 1 comprises a mobile communication terminal 20. The communication system 1 comprises a communication network 10. The communication network 10 has a radio access network (RAN). The radio access network includes a base station 11. The base station 11 may be operatively coupled to another node 12 which may be provided in the radio access network or in a core network (CN) of the communication network 10. The specific configuration of the communication network 10, of the base station 11 and of the node 12 depends on the communication standard. For illustration, the communication network 10 may be a Global System for Mobile Communications (GSM) network. In this case, the RAN is a GSM EDGE Radio Access Network (GERAN), with the node 12 being a base station controller. The communication network 10 may be a Universal Mobile Telecommunications System (UMTS) network. In this case, the RAN is a UMTS Terrestrial Radio Access Network (UTRAN), with the base station 11 being a NodeB and the node 12 being a Radio Network Controller (RNC). The communication network 10 may be a Long Term Evolution (LTE) network. In this case, the RAN is an evolved UTRAN (eUTRAN), with the base station 11 being an evolved Node B (eNodeB), and the node 12 being a Mobility Management Entity (MME) and/or Serving Gateway (S-GW) in the core network.

The base station 11 may be configured to perform an open loop power control for the downlink (DL), which is also referred to as downlink open loop power control. When a new connection is set up with the mobile communication terminal 20, the base station 11 may determine an initial power for transmissions to the mobile communication terminal 20. The base station 11 may be configured to determine the initial power based on power used to transmit to other mobile communication terminals, e.g. to mobile communication terminal 29. The base station 11 may be configured to alternatively or additionally use other available information to set determine the initial power for transmissions to the mobile communication terminal 20. The open loop power control for the downlink may set the initial power of downlink channels based on downlink measurement reports from the mobile communication terminal 20. The open loop power control algorithm for the downlink may be a typically fairly static algorithm. While the available information may be limited and the open loop power control algorithm may therefore not be perfect, the open loop power control algorithm has the purpose of giving an indication for the base station 11 to select a reasonable initial power level. The DL open loop power control may be implemented, for example, in accordance with 3GPP specification TS 25.401. The DL open loop power control may be implemented, for example, 3GPP specification TS 25.401 V11.1.0 (2012-12) entitled "3rd Generation Partnership Project; Technical Specification Group Radio Access Network; UTRAN overall description (Release 11)". As will be explained in more detail below, the mobile communication terminal 20 may perform an outer loop power control and an inner loop power control for the downlink.

The mobile communication terminal 20 has a wireless interface 21 or several wireless interfaces 21 to communicate with at least one radio access network (RAN). The wireless interface(s) 21 comprises one antenna 22 or several antennas. The wireless interface 21 has a receiver path 23 and a transmitter path 24 to perform the modulation and demodulation, respectively, required for the respective communication standard used by the mobile communication terminal 20. The mobile communication terminal 20 may be configured for communication with the RAN according to the Radio Resource Control (RRC) protocol.

The mobile communication terminal 20 is configured to perform an outer loop power control for the downlink, which is also referred to as downlink outer loop power control. The downlink outer loop power control may determine a target signal-to-interference (SIR) for the downlink. The downlink outer loop power control may receive input from quality estimates of the transport channel, measured in the mobile communication terminal 20. The quality estimates include a block error rate (BLER) for transmissions on the transport channel in the downlink. The downlink outer loop power control may mainly be used for a long-term quality control of the radio channel. As will be explained in more detail below, the mobile communication terminal 20 is configured such that, in a convergence phase after connection setup, the downlink outer loop power control is performed in dependence on a received signal code power (RSCP) of common pilot channel (CPICH) signals transmitted in the downlink, i.e., received at the mobile communication terminal 20 from the base station 11. After the determination of the quality estimates of the transport channel has converged, the downlink outer loop power control may be continued in dependence on the quality estimates of the transport channel.

The mobile communication terminal 20 may be configured to perform an inner loop power control for the downlink, which is also referred to as downlink inner loop power control. The downlink inner loop power control is sometimes also referred to as closed loop power control for the downlink, because it implements a closed loop control. This algorithm is also sometimes referred to as fast inner loop or fast closed loop power control, because it operates on much shorter time scales than the downlink outer loop power control. The downlink inner loop power control may set the power of the downlink dedicated physical channels and, for time division duplex (TDD), the power of the shared physical channels. The downlink inner loop power control may receive the quality target from the downlink outer loop power control. The downlink inner loop power control may send power control commands to the RAN.

The mobile communication terminal 20 may be configured to perform the downlink outer loop power and the downlink inner loop power control in accordance with 3GPP specification TS 25.401, for example. The mobile communication terminal 20 may be configured to perform the downlink outer loop power control and the downlink inner loop power control in accordance with, for example, 3GPP specification TS 25.401 V11.1.0 (2012-12) entitled "3rd Generation Partnership Project; Technical Specification Group Radio Access Network; UTRAN overall description (Release 11)".

The mobile communication terminal 20 has a processing device 25 coupled to the wireless interface 21. The processing device 25 may comprise one or several processors, one or several controllers, and/or one or several application specific circuit(s) (ASIC) to perform the downlink outer and inner loop power control. The processing device 25 is configured to perform the downlink outer loop power control which will be explained in more detail with reference to FIG. 2 to FIG. 7. In a convergence period, the processing device 25 performs the downlink outer loop power control based on the RSCP of CPICH signals received in the downlink. The convergence period may be triggered by connection setup and may end when the quality estimates of the transport channel, measured in the mobile communication terminal 20, fulfill a convergence criterion. The convergence period may end when a variance of the determined BLER for the transport channel in the downlink is less than a variance threshold, for example.

The mobile communication terminal 20 may have a memory 26 to store parameters used in the power control for the downlink. The memory 26 may store information indicating how the target SIR is to be adjusted in response to detecting a certain change in the RSCP of CPICH signals received in the downlink.

Downlink power control techniques performed by the mobile communication terminal 20 according to embodiments will be explained in more detail with reference to FIG. 2 to FIG. 7 in the following.

Figure 2:
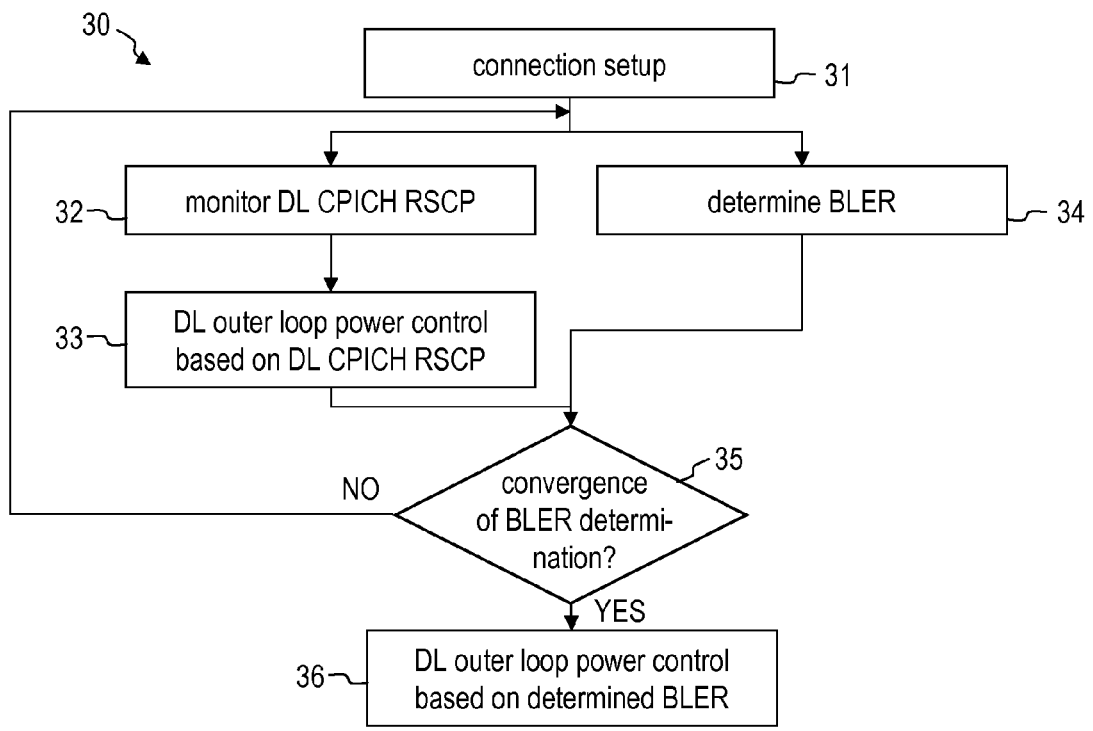
FIG. 2 is a flow chart of a method according to an embodiment.

FIG. 2 is a flow chart of a method 30 according to an embodiment. The method may be performed by the mobile communication terminal 20.

At 31, a connection setup is performed. The base station 11 may determine an initial power for transmissions to the mobile communication terminal 20 when the connection setup is performed. The base station 11 may perform a downlink open loop power control to set an initial power for downlink transmissions.

After connection setup, the mobile communication terminal performs a downlink outer loop power control in dependence on the RSCP of the CPICH signals received in the downlink. In parallel, the quality estimates of the transport channel may be determined for the downlink. When the quality estimates converge, the downlink outer loop power control may be continued independently of the RSCP of the CPICH signals and in dependence on the quality estimates of the transport channel.

At 32, the RSCP of the CPICH signals received in the downlink may be monitored. The RSCP of the CPICH signals indicates if the received power is likely too good or bad. The mobile communication terminal 20 can take quick actions to modify the target SIR directly after connection setup, instead of only relying on convergence of the BLER analysis. Time-averaging of the RSCP of the CPICH signals received in the downlink may be performed for each one of several time intervals. The rapidly varying changes in the RSCP of the CPICH signals may thereby be suppressed. Changes in the RSCP of the CPICH signals that are caused by transient conditions, e.g. by intermittent shadowing effects, may be discarded when performing the downlink outer loop power control.

At 33, the downlink outer loop power control is performed in dependence on the RSCP of the CPICH signals received in the downlink. In the downlink outer loop power control in dependence on the RSCP of the CPICH signals, the target SIR for the downlink inner loop power control may be adjusted in dependence on how the RSCP of the CPICH signals varied since connection setup. While the RSCP variation does not fully describe the variations for the required target SIR in the downlink outer loop power control, it provides a good indicator on whether the radio channel properties just recently have become significantly better or worse than when the initiation of the transmission occurred.

At step 34, the quality estimates of the transport channel are determined for the downlink. The BLER for transmissions from the base station may be determined. A cyclic redundancy check (CRC) may be performed on each packet, for example, to detect block errors. Because the target BLER is often in the order of one percent or less, the convergence time for such a BLER determination may be relatively long. Step 34 is performed in parallel with the downlink outer loop control at steps 32 and 33, in which the target quality for the downlink inner loop power control is adjusted in dependence on the RSCP of the CPICH signals in the downlink.

At step 35, it is determined whether the BLER determination fulfills a convergence criterion. This may be done in various ways. For illustration, a variance of the determined BLER may be established and may be compared to a variance threshold. Alternatively or additionally, a convergence time for the BLER determination may be computed based on a mean BLER determined up to this point. Alternatively or additionally, the variance or frequency of changes in the target SIR which would be obtained by inputting the BLER determined so far into the conventional downlink open loop power control algorithm may be monitored to determine whether the BLER determination has already converged sufficiently.

If it is determined that the BLER determination does not yet fulfill the convergence criterion, steps 33-35 are repeated.

If it is determined that the BLER determination fulfills the convergence criterion, the method proceeds to step 36. At step 36, the downlink outer loop power control is continued using the determined BLER as input. The downlink outer loop power control at step 36 does no longer need to use the RSCP of the CPICH signals as input.

Figure 3:
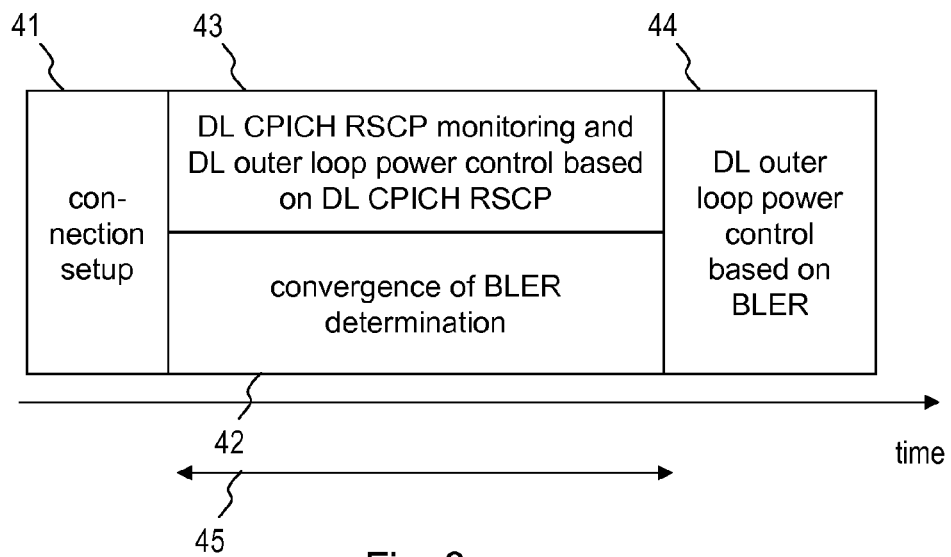
FIG. 3 is a diagram illustrating operating states of a mobile communication terminal according to an embodiment.

FIG. 3 is a diagram illustration operation states of the mobile communication terminal as a function of time.

In state 41, a connection setup is performed. The power for the downlink may be set using the downlink open loop power control. The initial power for signals from the base station will frequently be higher than what would actually be required.

Subsequently, a BLER determination is performed to obtain a quality estimate for the transport channels in the downlink. The BLER determination may be performed by checking validity of received packets at the mobile communication terminal. The BLER determination may include a CRC for received packets. The BLER determination may comprise any other validity check. For illustration, a validity check based on parity or based on a check sum may be performed.

In state 42, the BLER determination is in its convergence phase. The quality of the BLER estimate improves in the convergence phase. The variance of the determined BLER may decrease in the convergence phase. Similarly, a target SIR determined based on the BLER converges towards an appropriate value during the convergence phase. During the convergence phase, the target SIR output by a conventional downlink outer loop power control may still be too large and may converge slowly, leading to increased interference and increased power consumption.

In state 43, in parallel with the convergence of the BLER determination, the RSCP of the CPICH signals in the downlink is monitored. Variations in the RSCP of the CPICH signals in the downlink are used to adjust the target SIR provided by the downlink outer loop power control to the downlink inner loop power control. A downlink outer loop power control in dependence on the RSCP of the CPICH signals may be performed selectively only while the BLER determination is still in the convergence phase, i.e., until the BLER estimate is determined with sufficiently high accuracy for use in the downlink outer loop power control.

The end of the convergence phase may be determined in various ways. The variance of the determined BLER may be established and may be compared with a variance threshold. Alternatively or additionally, a duration 45 of the convergence phase may be computed from a mean BLER. Alternatively or additionally, the target SIR that would result from the conventional downlink outer loop power control may be analyzed to determine whether the convergence is sufficient.

In state 44, after convergence of the BLER determination, the downlink outer loop power control is continued in a conventional way, using the determined BLER as input.

The downlink outer loop power control is performed both in state 43 and in state 44. However, different input parameters are input to the downlink outer loop power control. In state 43, the RSCP of the CPICH signals in the downlink is used as input for the downlink outer loop power control. In state 44, the determined BLER is used as input for the downlink outer loop power control.

Figure 4:
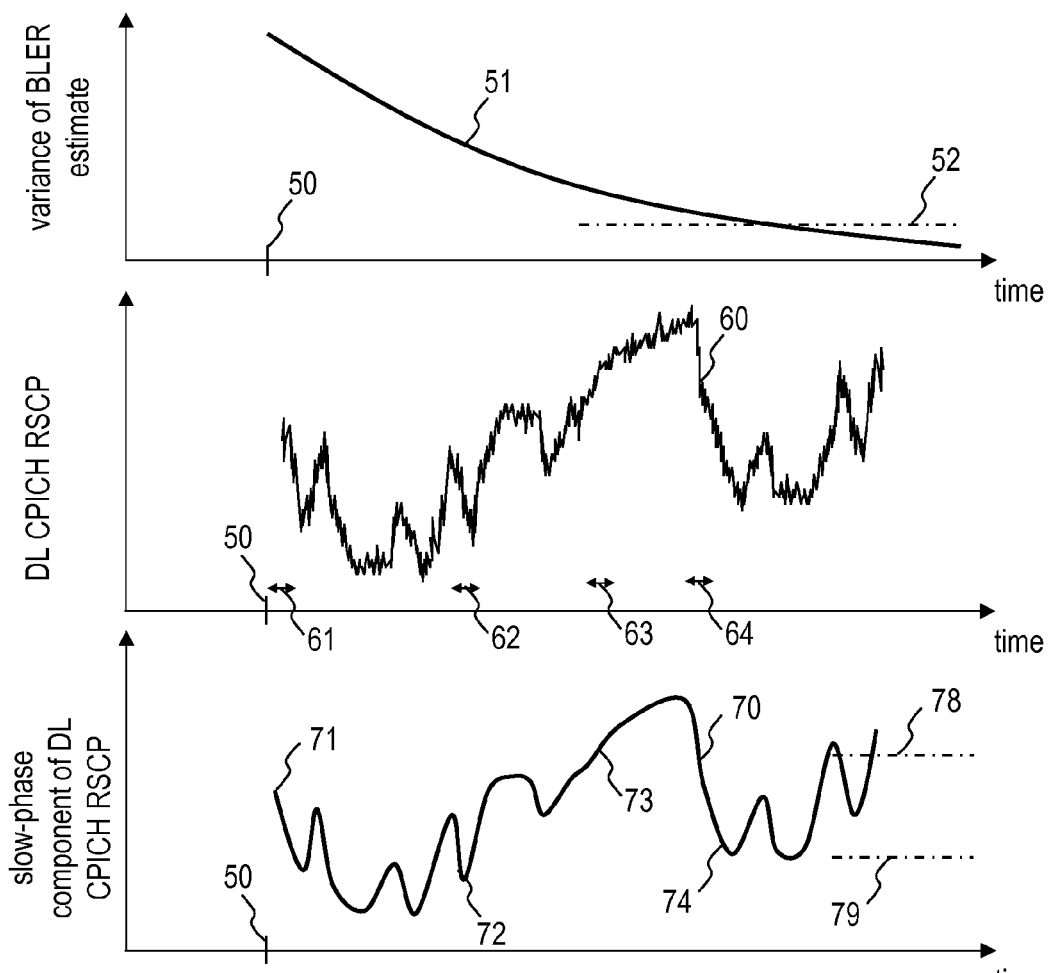
FIG. 4 shows a variance of a block error rate determination, a received signal code power of downlink common pilot channel signals, and a time-averaged received signal code power of downlink common pilot channel signals for illustrating operation of a mobile communication terminal according to an embodiment.

FIG. 4 illustrates the operation of a mobile communication terminal according to embodiments.

After connection setup at a time 50, a variance 51 of the BLER may initially have a large value. This reflects that, for a characteristic BLER of one percent or a few percent, a large number of packets must be analyzed to determine the BLER. The variance 51 decreases, reflecting that the BLER is determined with higher accuracy when a greater number of packets has been analyzed. When the variance falls below a variance threshold 52, the BLER determination has converged so that the determined BLER may be used to determine the target SIR in the conventional downlink outer loop power control.

FIG. 4 also illustrates an exemplary RSCP 60 for the CPICH signals in the downlink. The RSCP 60 may have fast variations superimposed on more slowly varying variations, which are also referred to as slow-phasing variations. The fast variations may be caused by intermittent shadowing effects, interference and/or other transient effects.

The mobile communication terminal 20 may be configured to respectively average the RSCP 60 of the CPICH signals in the downlink over a time interval. Averaging may be performed in a first time interval 61 which is triggered by connection setup at time 50. The averaging may be repeated for at least one second time interval 62-64 which starts later than the first time interval 61. A sliding observation window may be used to respectively determine the time-averaged RSCP of the CPICH signals in the downlink as a function of time. The averaging of the RSCP of the CPICH signals in the downlink effectively suppresses fluctuations from the RSCP which have frequencies greater than the inverse of the duration of the time intervals 61-64.

FIG. 4 also illustrates the time-averaged RSCP 70 determined by respectively averaging the RSCP 60 for the CPICH signals in the downlink over a time interval.

At completion of the connection setup, the time-averaged RSCP 70 is a first RSCP 71. The first RSCP 71 is obtained by averaging the RSCP 60 of the CPICH signals in the downlink over the first time interval 61.

At later times during the convergence period, the time-averaged RSCP 70 may have other values, indicating that the signal conditions have improved or have worsened since connection setup. For illustration, at time interval 62, the time-averaged RSCP 70 is a second RSCP 72. The second RSCP 72 is obtained by averaging the RSCP 60 of the CPICH signals in the downlink over the second time interval 62. The second RSCP 72 is less than the first RSCP 71, indicating a corresponding chance in signal conditions. At time intervals 63, 64, the time-averaged RSCP 70 is a second RSCP 73, 74. The second RSCP 73, 74 is obtained by averaging the RSCP 60 of the CPICH signals in the downlink over the second time interval 63 or 64, respectively.

When performing the downlink outer loop power control based on the RSCP of the CPICH signals in the downlink, the mobile communication terminal 20 may adjust a target SIR provided to the downlink inner loop power control based on a comparison of the second RSCP 72-74 to the first RSCP 71. A first threshold 78 may be defined in dependence on the first RSCP 71. The first threshold 78 may be defined by the processing device 25 by multiplying the first RSCP 71 by a pre-defined factor and/or by using a lookup field which indicates first thresholds as a function of the first RSCP 71. The second threshold 79 may be defined by the processing device 25 by multiplying the first RSCP 71 by another pre-defined factor and/or by using a lookup field which indicates second thresholds as a function of the first RSCP 71.

The second RSCP 72-74 determined at later times during convergence of the BLER determination may be respectively compared to the first threshold 78 and the second threshold 79. During the convergence phase, the target SIR provided by the downlink outer loop power control may be adjusted depending on the comparison of the second RSCP to the first threshold 78 and the second threshold 79. The target SIR may be decreased if the second RSCP 72-74 determined in one of time intervals 72-74 exceeds the first threshold 78. The target SIR may be increased if the second RSCP 72-74 determined in one of time intervals 72-74 is below the second threshold 79.

The monitoring of the RSCP of the CPICH signals in the downlink may also be used for adjusting a transmit power of the mobile communication terminal 20. The processing device 25 may perform an uplink power control which takes into account the RSCP of the CPICH signals in the downlink during convergence of the BLER determination.

While the variance of the determined BLER may be one indicator for convergence of the BLER determination, additional or alternative convergence criteria may be used to establish whether the BLER determination has converged sufficiently to perform the downlink outer loop power control based on the determined BLER. For illustration, a target SIR that results when inputting the determined BLER to the downlink outer loop power control algorithm may be computed and analyzed. As long as the thus computed target SIR shows a big variance and/or changes frequently, the target SIR determined based on the BLER may be discarded and the target SIR determined based on the RSCP of the CPICH signals in the downlink may be used instead, as will be explained in more detail with reference to FIG. 5 and FIG. 6.

Figure 5:
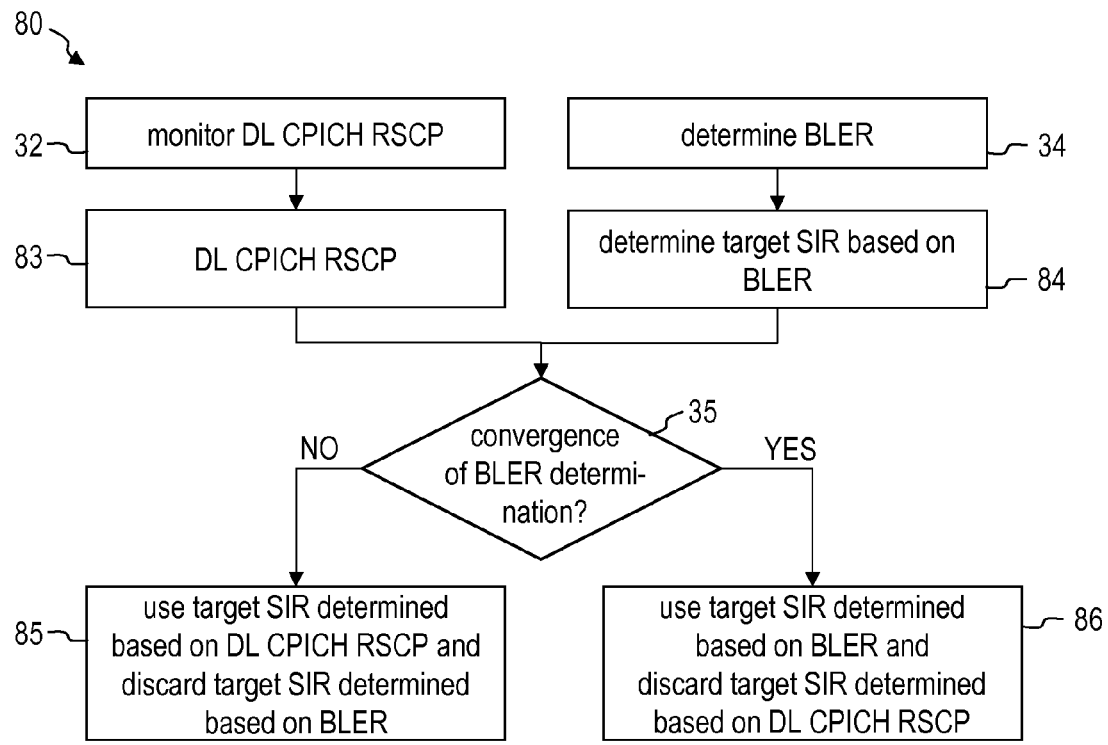
FIG. 5 is a flow chart of a method according to an embodiment.

FIG. 5 is a flow chart of a method 80 according to an embodiment.

At 32, a RSCP of the CPICH signals in the downlink is monitored after connection setup. At 84, a target SIR is determined based on the RSCP of the CPICH signals in the downlink. The target SIR may be determined as described with reference to FIG. 4. The target SIR may be selectively adjusted when the ratio of the RSCP detected during the convergence phase and the RSCP detected immediately after connection setup exceeds an upper threshold or falls below a lower threshold.

At 34, in parallel to steps 32 and 83, the BLER is determined for transmissions in the downlink for a transport channel. At 84, a target SIR is determined based on the BLER estimated from the transmissions between connection setup and the time at which step 84 is executed. The target SIR may be determined by using the BLER as input for the downlink outer loop power control algorithm.

At 35, it is determined whether the BLER determination fulfills a convergence criterion.

At 85, if the BLER determination does not yet fulfill the convergence criterion, the target SIR determined based on the RSCP of the CPICH signals in the downlink at step 83 may be used for performing the downlink inner loop power control. The target SIR determined based on the BLER at step 84 may be discarded.

At 86, if the BLER determination fulfills the convergence criterion, the target SIR is determined based on the BLER at step 84 may be used for performing the downlink inner loop power control. The target SIR determined based on the RSCP of the CPICH signals in the downlink at step 83 may be discarded.

Steps 32, 83, 34, 84, and 35 may be repeated thereafter. For illustration, after step 85, the method may return to perform steps 32 and 34.

Figure 6:
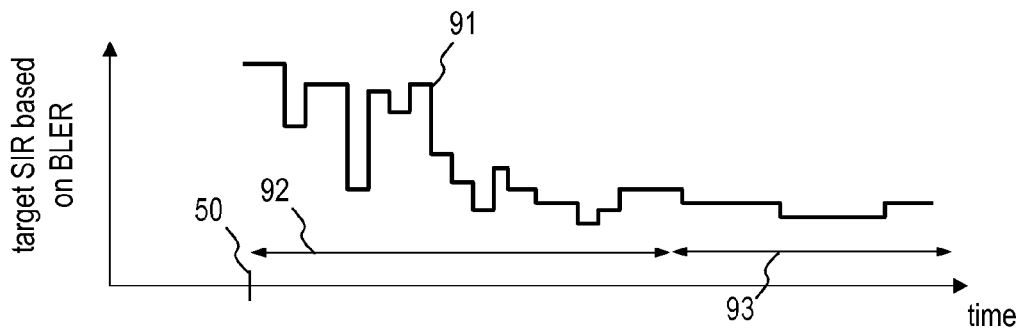
FIG. 6 shows a target signal-to-interference ratio during a convergence phase for illustrating operation of a mobile communication terminal according to an embodiment.

FIG. 6 illustrates the target SIR 91 which is obtained by using the BLER as input for a conventional downlink outer loop power control algorithm. The target SIR 91 shows many changes in a convergence phase 92. In a time period 93 after the determination of the BLER has converged, the target SIR 91 shows less frequent and/or smaller-amplitude changes. By analyzing the target SIR 91 which is determined by a conventional downlink outer loop power control algorithm which uses the BLER as input, the processing device 25 of the mobile communication terminal 20 may determine whether this target SIR 91 may be used as quality target for the downlink inner loop power control or whether a target SIR which depends on the RSCP of the CPICH signals in the downlink should be used instead.

Figure 7:
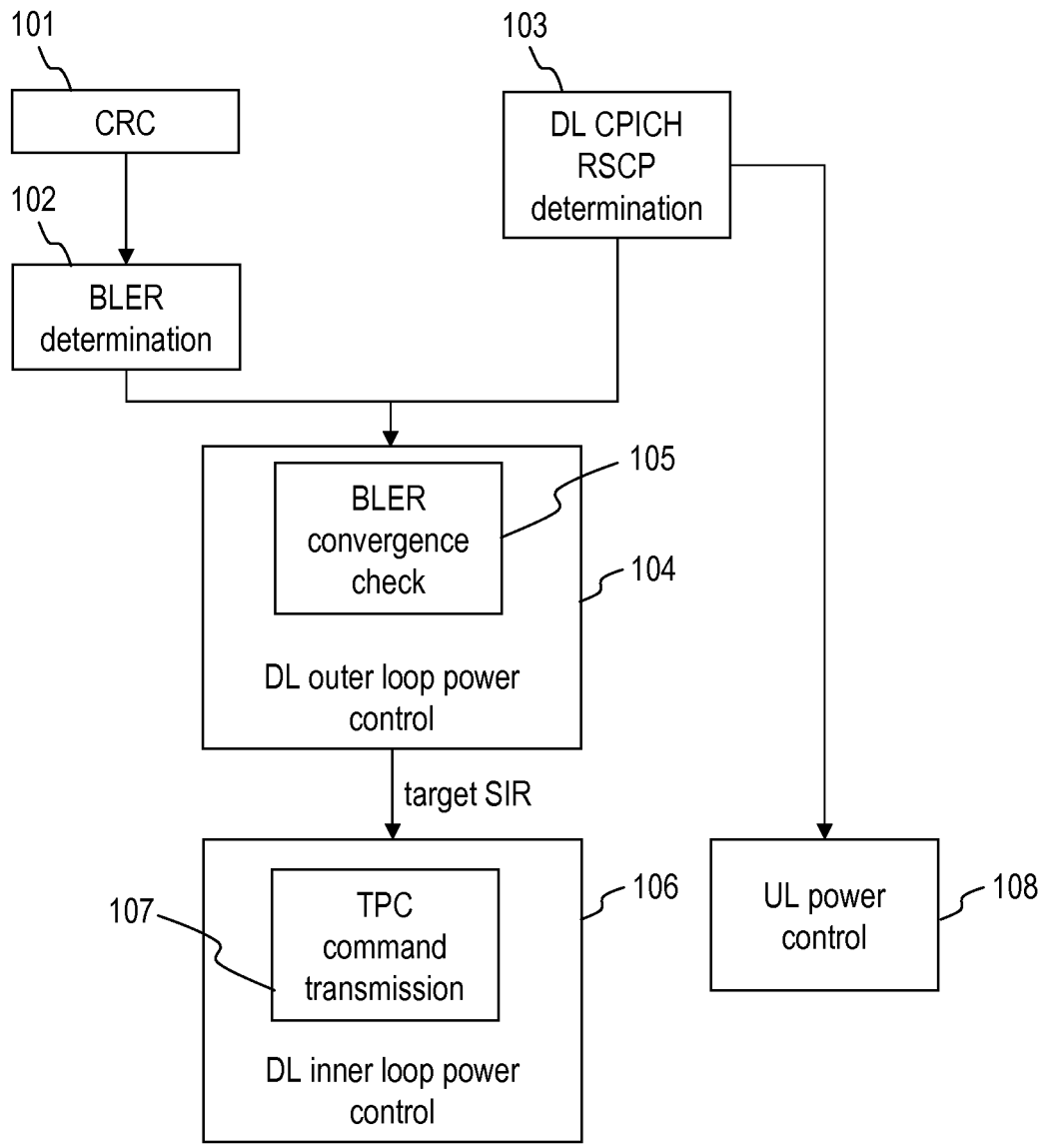
FIG. 7 is a functional block diagram of a mobile communication terminal according to an embodiment.

FIG. 7 is a functional block diagram of a mobile communication terminal according to an embodiment. Some or all of the functions illustrated in FIG. 7 may be performed by the processing device 25 of the mobile communication terminal 20. The various functional blocks may correspond to modules of a control program executed by the processing device 25.

A CRC function 101 performs a cyclic redundancy check (CRC) for packets received at the mobile communication terminal 20 from the base station 11 over a transport channel.

A BLER determination function 102 determines the BLER based on the CRC established by the CRC function 101.

A RSCP determination function 103 determines the RSCP of the CPICH signals in the downlink.

A downlink outer loop power control function 104 performs a downlink outer loop power control. The downlink outer loop power control function 104 may have a BLER convergence check function 105 which establishes whether the BLER determination performed by the BLER determination function 102 fulfills a convergence criterion. The downlink outer loop power control 104 selectively uses the BLER determined by the BLER determination function 102 or the RSCP of the CPICH signals in the downlink to determine a target SIR. The downlink outer loop power control 104 may output a target SIR determined based on the RSCP of the CPICH signals in the downlink for a downlink inner loop power control while the BLER convergence check function 105 determines that the BLER determination performed by the BLER determination function 102 does not yet fulfill the convergence criterion. The downlink outer loop power control 104 may output a target SIR determined based on the determined BLER for the downlink inner loop power control when the BLER convergence check function 105 determines that the BLER determination performed by the BLER determination function 102 fulfills the convergence criterion.

A downlink inner loop power control function 106 performs an inner loop power control. The inner loop power control may be implemented as a closed loop power control, so as to ensure that the measured SIR in the downlink follows the target SIR provided by the downlink outer loop power control function 104. The downlink inner loop power control function 106 may comprise a Transmit Power Control (TPC) command transmission function 107. The TPC command transmission function 107 may be configured to transmit power up/down signals in dependence on a comparison of the measured SIR and the target SIR. The TPC command transmission function 107 may be configured to transmit a TPC command once every slot.

An uplink power control function 108 may be configured to adjust a transmit power of the mobile communication terminal. The uplink power control function 108 may selectively increase or decrease the transmit power based on the RSCP of the CPICH signals in the downlink. This may be implemented in a manner similar to the adjustment of the target SIR described with reference to FIG. 2 to FIG. 6 above. For illustration, the transmit power may be increased when the history of the RSCP of the CPICH signals in the downlink shows that the quality has decreased since connection setup. The transmit power may be decreased when the history of the RSCP of the CPICH signals in the downlink shows that the quality has increased since connection setup.

While embodiments have been described in detail with reference to the drawings, various modifications may be implemented in other embodiments.

For illustration, while embodiments have been described in which time-averaging is performed for the RSCP of the CPICH signals in the downlink to determine whether the target SIR is to be increased or decreased, the time-averaging may also be omitted. While embodiments have been described in which a threshold comparison is performed for the RSCP of the CPICH signals to determine whether the target SIR is to be adjusted, the target SIR may be adjusted according to other criteria during convergence of the BLER determination. For illustration, the target SIR may be adjusted after lapse of a pre-determined time interval, based on the history of the RSCP of the CPICH signals in the time interval from connection establishment.

For further illustration, embodiments of the invention may be used in a wide variety of communication systems. The methods and mobile communication devices may be used in systems which employ time division duplex (TDD) or frequency division duplex (FDD).

Methods and devices according to embodiments provide a quick and simple modification of the conventional downlink power control. The downlink outer loop power control is performed based on the RSCP of the CPICH signals in the downlink until determination of a quality estimate for the transport channel converges. This reduces the base station output power during the initial phase after, e.g., phone call setup, leading to improved interference and system capacity.

The invention claimed is:

1. A power control method performed by a mobile communication terminal, the power control method comprising:
   determining a received signal code power of common pilot channel signals received from an individual base station on a common pilot channel in at least one time interval;
   performing a block error rate determination to determine a block error rate for transmissions received from the individual base station; and
   performing a downlink outer loop power control, wherein, in response to a connection setup, the downlink outer loop power control is performed in dependence on the determined received signal code power of the common pilot channel signals until the block error rate determination fulfills a convergence criterion,
   wherein determining the received signal code power comprises:
      determining a first received signal code power of the common pilot channel signals in a first time interval at completion of the connection setup, and
      determining a second received signal code power of the common pilot channel signals in a second time interval which starts later than the first time interval;
   wherein the downlink outer loop power control is performed in dependence on a comparison between the second received signal code power and the first received signal code power until the block error rate determination fulfills the convergence criterion.

2. The power control method according to claim 1, wherein the downlink outer loop power control is performed independently of the determined received signal code power of the common pilot channel signals after the block error rate determination fulfills the convergence criterion.

3. The power control method according to claim 1, wherein the downlink outer loop power control is performed in dependence on the determined received signal code power in a convergence time period which is triggered by the connection setup and which terminates when the block error rate determination fulfills the convergence criterion.

4. The power control method according to claim 1, wherein performing the downlink outer loop power control in dependence on the comparison between the second received signal code power and the first received signal code power comprises:
   setting a target signal-to-interference ratio in dependence on a comparison of the second received signal code power and a signal code power threshold which is determined in dependence on the first received signal code power.

5. The power control method according to claim 4, wherein the target signal-to-interference ratio is decreased if the second received signal code power exceeds a first threshold, and
   wherein the target signal-to-interference ratio is increased if the second received signal code power is lower than a second threshold which is less than the first threshold.

6. The power control method according to claim 4, further comprising:

performing an inner loop power control in dependence on the target signal-to-interference ratio.

7. The power control method according to claim 1, wherein the first received signal code power is a time-average of the received signal code power of the common pilot channel signals in the first time interval and the second received signal code power is a time-average of the received signal code power of the common pilot channel signals in the second time interval.

8. The power control method according to claim 1, further comprising:
controlling a transmit power of the communication terminal in dependence on the determined received signal code power of the common pilot channel signals until the block error rate determination fulfills the convergence criterion.

9. A mobile communication terminal, comprising:
a receiver configured to receive signals from an individual base station; and
a processing device coupled to the receiver, the processing device being configured to:
determine a received signal code power of common pilot channel signals received from the individual base station on a common pilot channel in at least one time interval;
perform a block error rate determination to determine a block error rate for transmissions received from the individual base station; and
perform a downlink outer loop power control in dependence on the determined received signal code power of the common pilot channel signals in response to a connection setup until the block error rate determination fulfills a convergence criterion,
wherein determining the received signal code power comprises:
determining a first received signal code power of the common pilot channel signals in a first time interval at completion of the connection setup, and
determining a second received signal code power of the common pilot channel signals in a second time interval which starts later than the first time interval;
wherein the downlink outer loop power control is performed in dependence on a comparison between the second received signal code power and the first received signal code power until the block error rate determination fulfills the convergence criterion.

10. The mobile communication terminal according to claim 9, further comprising:
a transmitter;
wherein the processing device is coupled to the transmitter and is configured to control a transmit power of the communication terminal in dependence on the determined received signal code power of the common pilot channel signals until the block error rate determination fulfills the convergence criterion.

11. A communication system, comprising:
a base station; and
the mobile communication terminal according to claim 9.

* * * * *